United States Patent [19]

Ambrus et al.

[11] 4,380,248

[45] Apr. 19, 1983

[54] EQUIPMENT FOR THE MEASUREMENT OF EVAPORATION AND/OR PRECIPITATION

[75] Inventors: Valéria Ambrus; Henrik Karsai, both of Budapest, Hungary

[73] Assignee: Ganz Muszer Muvek, Budapest, Hungary

[21] Appl. No.: 171,641

[22] Filed: Jul. 21, 1980

[30] Foreign Application Priority Data

Jul. 21, 1979 [HU] Hungary ........................... KA 1532

[51] Int. Cl.³ ............................................. F16K 31/32
[52] U.S. Cl. ................................... 137/428; 137/572
[58] Field of Search ................................. 73/308, 171; 137/101.27, 101.21, 391, 392, 409, 429, 572

[56] References Cited

U.S. PATENT DOCUMENTS

| | | | |
|---|---|---|---|
| 2,903,678 | 9/1959 | Wills | 73/313 X |
| 3,114,478 | 12/1963 | Hilkemeier et al. | 73/308 X |
| 3,229,519 | 1/1966 | Nilsson | 73/171 |
| 3,469,596 | 9/1969 | Branton | 137/392 X |
| 3,882,967 | 5/1975 | Gulla et al. | 137/392 X |
| 3,893,625 | 7/1975 | Wiggins | 137/572 X |
| 4,001,533 | 1/1977 | Conery et al. | 73/308 X |
| 4,064,755 | 12/1977 | Bongort et al. | 73/313 |
| 4,245,499 | 1/1981 | Nguyen et al. | 73/171 |
| 4,265,262 | 5/1981 | Hotine | 137/392 X |

FOREIGN PATENT DOCUMENTS 2416053  8/1975  Fed. Rep. of Germany ...... 137/391

*Primary Examiner*—Daniel M. Yasich
*Attorney, Agent, or Firm*—Young & Thompson

[57] ABSTRACT

The invention represents an evaporation and/or precipitation measuring equipment, which can measure with high-accuracy, continuously and automatically the evaporation of an open water surface and simultaneously eventual precipitation. The value of evaporation, which is defined as the decrease of the water level of a standard evaporation measuring vat, is measured by the equipment with the quantity of water necessary to compensate the original level. Precipitation on the other hand is measured with that quantity of water which needs to be let out in order to restore the original water level of the vat. The high accuracy can be obtained on the one hand by adjusting deliberately small feeding resp. lower quantities. On the other hand the sensing unit of the equipment watches the water level of the evaporation measuring vat with high accuracy, and controls the supply and lower units respectively when the level varies due to either evaporation or precipitation. The electronic circuit of the equipment counts separately the quantities dosed and lowered respectively, and leads said information e.g. to a recording instrument.

2 Claims, 2 Drawing Figures

EQUIPMENT FOR THE MEASUREMENT OF EVAPORATION AND/OR PRECIPITATION

The invention refers to electronic evaporation and/or precipitation measuring equipment, advantageously, for the continuous high accuracy measurement of open water surface, providing the possibility for simultaneous measurement of precipitation.

Evaporation can be determined by the measurement of the water level of evaporation pans with standard surface, installed in the field. Nowadays the measurement is made generally by approaching a plate by a spindle having a micrometer scale, to the actual water level. Starting from the relative zero level, the momentary level can well be measured since the plate abruptly changes its brightness when touching the water surface, but in windy weather the waves disturb the measurement. This method cannot be automated, and due to the cost of labor, it can hardly be performed frequently.

There are also devices which measure instead of the level of the evaporating water, the quantity of the water used to compensate the evaporation. In this case a float opens a pin valve and leads water from a reservoir to the evaporation pan until the nominal level is restored. The evaporation can be read at the supply vessel. The measuring accuracy of this method does not satisfy the requirements.

The common disadvantage of the above methods is that in case of precipitation this has to be measured with a separate instrument and this must be taken into account as a correction.

The requirement is to measure the variation of the water surface with the accuracy of appr. 0.01 millimeter possibly continuously and in an appropriate form for telemetering that is, by automation.

The object of this invention is to provide an automatic measuring apparatus which is able to measure with a resolution of some 0.001 millimeter not only the evaporation but also precipitation without the need of supervising personnel. Instead of directly measuring the water level of the evaporation pan, the invented apparatus keeps the level with high accuracy at a constant value. This is achieved by controlling a filling unit and a tapping unit as often as the level varies in a negative (evaporation) and a positive (precipitation) direction respectively. These units fill and tap respectively water in the pan in deliberately predetermined quantities until the level sensor senses again the original level. The high accuracy measurement of evaporation and precipitation respectively is carried out at the filling and tapping units respectively by the electronic circuits of the apparatus, which count the filling (evaporation) and the tapping (precipitation) quantities respectively and deliver the measurement results in the form of appropriate signals for recording or processing.

The functional units of the apparatus can be realized with different components. The electronic water level sensor e.g. can be realized with opto-electronic, electromagnetic or electrodynamic components. The filling and tapping unit respectively can be realized, e.g. with valves and dose tube or with a membrane pump.

The invention will be better understood from the accompanying drawing, in which.

Figure 1:
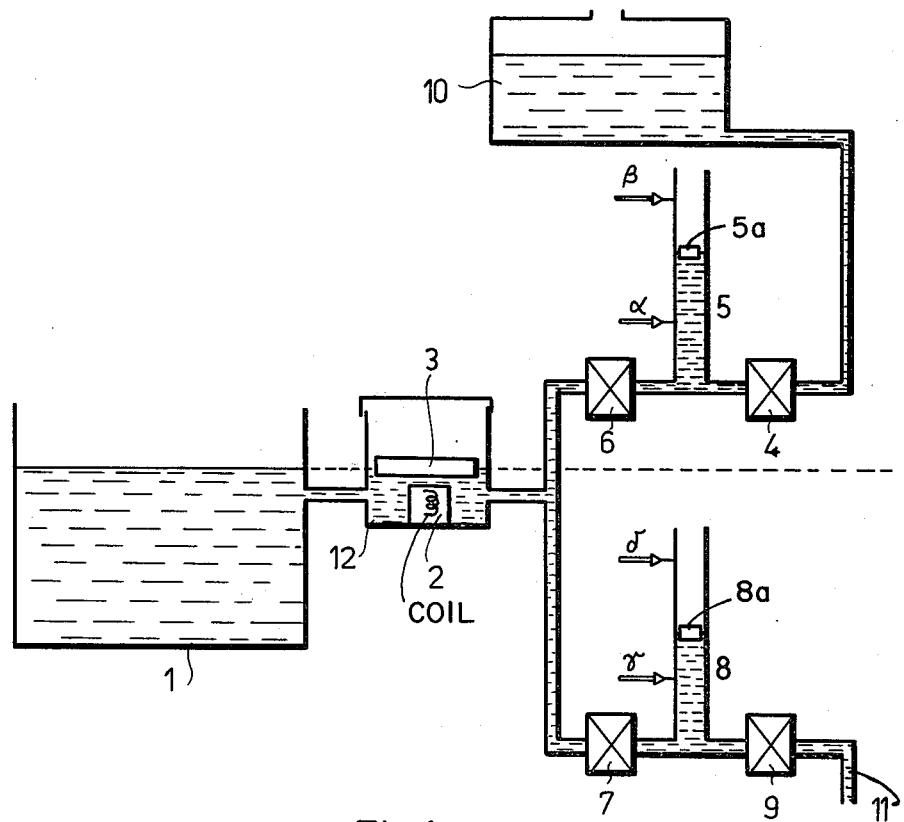
FIG. 1 is a schematic view of the apparatus.

As shown in the drawing, an evaporation pan 1 is connected by a tube to a level sensor vessel 12 in which there is provided a sensing coil 2 constituting the input of a conventional oscillator circuit, and a float 3 carrying a metal plate. A possible realization of the filling unit comprises valves 4, 6, a filling tube 5 containing a magnetic float 5a and a reservoir 10. There are two position sensors schematically shown at $\alpha$ and $\beta$ (e.g. reed-contacts) on the feeding tube. The tapping unit consists for instance of valves 7 and 9, the tapping tube 8 with magnetic float 8a and position sensors schematically shown at $\gamma$ and $\delta$ and an outlet 11.

Another possible realization of the filling and lower unit is a stepwise controlled membrane pump as a replacement for each.

Upon evaporation, due to the decreasing water level, the metal plate on the float 3 changes the value of Q of the sensor coil. This results in amplitude variation of the oscillator and with a "fault-signal" obtained in this way, the valve 6 is controlled which opens and feeds water to the level sensing vessel 12. The surface of this is about a thirtieth part of the surface of the evaporation measuring pan and the vessel is connected to the pan by a tube with a small—e.g. 8 mm—diameter. The water flowing into the level sensing vessel 12 elevates the float 3. This changes the Q value of the sensor coil 2 in the opposite direction. The "fault signal" obtained in this way causes valve 6 to close. When the water continues to flow into the evaporation measuring pan 1, then the float 3 falls again and the signal of the sensor coil 2 controls again the valve 6 to open. This process continues until after equalization of the level in pan 1 and in the level sensing vessel 12.

When during this process the magnetic float in the filling tube reaches the level of the reed-contact $\alpha$, then this controls valve 4. A logic circuit simultaneously blocks all the other valves. In this way feeding tube 5 is filled up till its magnetic float reaches the level of reed-contact $\beta$, which closes valve 4. After this the dosing of water continues in small steps until the zero level is restored in the pan. The cross-section of filling tube 5 and the distance of the two reed-contacts mounted on it —which data determine the dose quantity—is reasonably chosen in such a way that the quantity shall correspond to some (e.g. 5) thousandth parts of a millimeter evaporation.

In the case of precipitation the float 3 is elevated above the zero level and the sensor coil 2 controls valve 7. This starts the filling of the tapping tube 8 in the same manner in small steps, until the magnetic float in it reaches the level of reed contact $\delta$. This opens valve 9 and at the same time a logic circuit blocks all the other valves. When the tapping tube is emptied, effected by the magnetic float, reed-contact $\gamma$ closes valve 9 and tapping continues until the sensor senses again zero level.

As often as valve 4 or valve 9 functions, this gives a pulse to the evaporation-precipitation counter circuit respectively, which gives the information—after the necessary transformation —to the recording instrument.

In order to prevent hunting, upon the occurrence of each function, the opposite function is blocked for a certain time.

Figure 2:
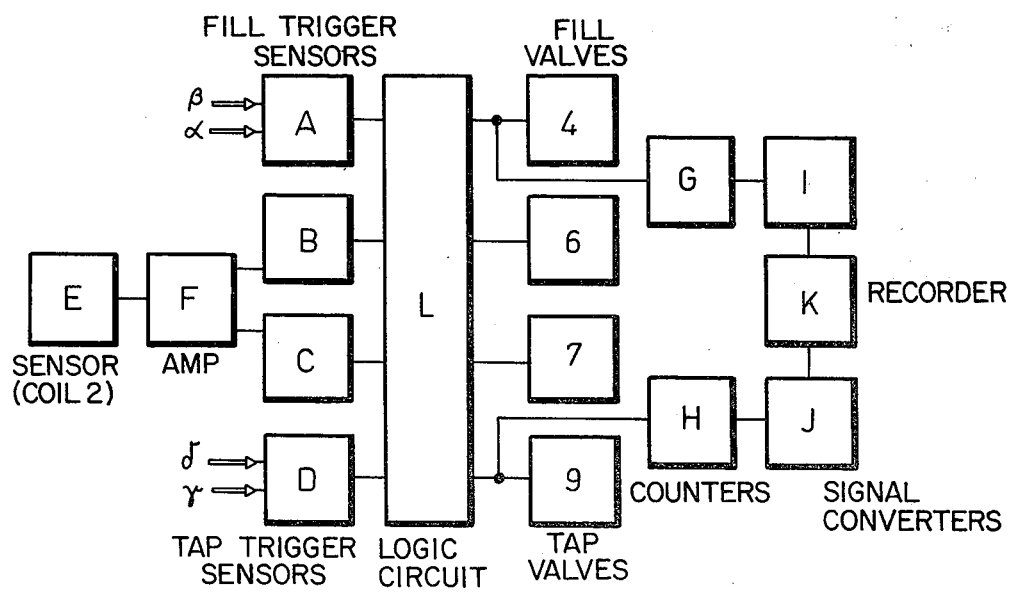
FIG. 2 shows the block diagram of the electric circuit.

FIG. 2 shows the electric block diagram of the equipment, all of the individual components of which are conventional off-the-shelf items. Sensor E (coil 2) is connected to amplifier F, the evaporation and precipitation outputs respectively of which are followed by Schmitt-circuits B and C respectively. Logic circuit L has on the input side, in addition to B and C flip-flops, also A and D flip-flops, which are controlled by reed-contacts of the filling and tapping tubes respectively. At the output of logic circuit L there are valves 4, 6, 7 and 9, further on, valves 4 and 9 are followed by counters G and H respectively which are connected through signal converters I and J to separate inputs of the recording instrument K. Functioning of the circuits is clear from FIG. 1.

The operation of the device, and how to make and use it, will now be quite clear to those skilled in the art:

The filling unit consists of valves 4 and 6, and filling tube 5 with magnetic float and positions sensors $\alpha$ and $\beta$. The tapping unit consists of valves 7 and 9 and tapping tube 8 with its magnetic float and position sensors $\gamma$ and $\delta$. These two units together with the reservoir 10 and the logic circuit constitute a level control system, which, by measuring the filling and tapping water quantities necessary to control the level, delivers at the same time accurately the quantity of evaporation and precipitation, respectively. 11 of course is the outlet for rain water.

The operation can be summed up as follows: the Q-value of coil 2, being part of an oscillator circuit, changes depending on the position of float 3. This causes a change in the amplitude of the oscillator signal. In case of evaporation, the amplitude decreases and the logic circuit controls valve 6 to open until float 3 returns to its original or zero position. If the quantity of water stored in filling tube 5 is not sufficient, position sensor $\alpha$, when reached by the magnetic float, closes valve 6 and opens valve 4 which will close again when the magnetic float reaches position sensor $\beta$. At this moment valve 6 opens again until the original level is restored in the pan 1. The counter circuit counts how many times valve 4 was in operation, thus determining the filling quantities (i.e. the value of evaporation) for the recorder, the display or the procesor.

If the logic circuit senses increasing amplitude (in case of precipitation), it will control valve 7 through which the additional rainwater can flow into the tapping tube until float 3 reaches its original position. When the magnetic float in the tapping tube reaches position sensor $\beta$, this closes, through the logic circuit, valve 7 and opens valve 9, until the magnetic float reaches position sensor $\gamma$. At this moment valve 9 closes and valve 7 opens and the operation continues until the original level in the pan 1 is restored. The counter circuit, which is part of the logic circuit, counts how many times valve 9 was in operation thus determines the number of tapping quantities (i.e., the value of precipitation).

The apparatus provides the possibility for continuous measurement without supervising personnel and supplies an electric signal which is directly appropriate for data processing or recording.

The measurement can be carried out with practically discretional resolution, by choosing the geometry of the filling tube 5 and tapping tube 8 appropriately, or in case of other embodiments by choosing the filling and tapping quantity appropriately.

The measurement of evaporation and precipitation is made with the same instrument (sensor) at the same place, by which fact the correction failure occurring in the conventional methods is eliminated.

The level sensing vessel is protected and closed, which eliminates the failure due to waves.

Commissioning of the apparatus is simple and it can be adjusted to existing standard pans without altering their original characteristics.

We claim:

1. Apparatus for the measurement of evaporation and precipitation, comprising an open-topped pan for a quantity of water, said pan fluidly connected to feeding and tapping means for detecting a predetermined water level in the pan, means responsive to a fall in the water level in the pan below said predetermined level to feed a first plurality of quantities of water of predetermined volume to the pan until said predetermined water level is restored, means responsive to a rise in water level in the pan above said predetermined level to tap from the pan a second plurality of quantities of water of predetermined volume until said predetermined water level is restored, a float chamber connected in fluid communication with said pan through a tube of relatively small cross section disposed below said predetermined level, a float in said float chamber, means responsive to the height at which said float floats in said float chamber to control said feeding means and tapping means, and means for counting and recording as evaporation said first plurality of quantities of water of predetermined volume and for counting and recording as precipitation said second plurality of quantities of water of predetermined volume and providing a continuous measurement.

2. Apparatus as claimed in claim 1, said feeding means comprising a filling tube containing a magnetic float and two vertically spaced sensors of the level of said magnetic float, a supply of water connected to said filling tube, a tapping tube containing a magnetic float and having a pair of vertically spaced sensors of the level of said magnetic float, said tapping tube communicating with an outlet for tapped water, both said tubes communicating with said pan, of the pan connection means and separate valve means for controlling the communication of said filling tube with said source of water and said tapping tube with said outlet, said valve means being selectively responsive to the movement of said magnetic floats between said sensors to fill or tap said pan until said original water level is restored therein, said counting means counting the number of operations of said valve means and providing a continuous measurement.

* * * * *